(No Model.)

P. M. SHARPLES.
METHOD OF BALANCING CENTRIFUGAL VESSELS.

No. 454,072. Patented June 16, 1891.

Witnesses
Ed. A. Kelly
David Levan

Philip M. Sharples Inventor
By his Attorney

UNITED STATES PATENT OFFICE.

PHILIP M. SHARPLES, OF WEST CHESTER, PENNSYLVANIA.

METHOD OF BALANCING CENTRIFUGAL VESSELS.

SPECIFICATION forming part of Letters Patent No. 454,072, dated June 16, 1891.

Application filed January 19, 1891. Serial No. 378,216. (No model.)

*To all whom it may concern:*

Be it known that I, PHILIP M. SHARPLES, a citizen of the United States, residing at West Chester, in the county of Chester, State of Pennsylvania, have invented certain Improvements in Methods of Balancing Centrifugal Vessels, of which the following is a specification.

Vessels of different forms mounted rigidly upon vertical spindles rotated in suitable bearings are employed in a variety of centrifugal machines, and the high speed at which they are run in order to develop sufficient centrifugal force to effect their purpose renders it extremely important that their balance with respect to said bearings should be as perfect as possible.

The object of my invention is to establish a definite method of correcting the distribution of weight in such machines, so as to make the normal axis of rotation correspond with the center line of the bearings or fixed axis of rotation, thus insuring perfectly easy and steady running. The means ordinarily employed with satisfactory results to attain the practical equilibrium of rotating parts cannot be depended upon to serve the purpose satisfactorily in this class of machines, in which forces are developed by the excessive speed which do not practically enter into the problem ordinarily. The forces to be considered in these vessels at these high speeds are, first, the tendency of the body to rotate on a vertical axis passing through the center of gravity; second, the tendency of each particle to get as far as possible from the center of the rotating mass due to centrifugal force, which position is only assumed when it is on the plane passing through the center at right angles to the axis of rotation. Every particle above this plane must be balanced by a corresponding particle below it, or else this tendency must be neutralized by the bearings for the spindle at the expense of wear and friction, which the object is to avoid. A very small weight upon one side of a horizontal plane at right angles to the axis of rotation not held in equilibrium by a corresponding weight upon the other side will at high speeds change the normal axis of rotation and throw considerable strain upon the bearings in maintaining any other axis, and likewise produces an unsteady motion, which retards the work of the machine. The same laws seem to apply to the rotation of the mass that apply in the rotation of the earth, the spindle being apparently a mere appendage, and the problem being to so distribute the mass as to cause the normal axis of rotation to correspond with the axis of the spindle. As the shape of the bowl is more or less changed at high speeds, the distribution should be made correct at working speed. My method of balancing is based upon the systematic utilization of these forces, and is fully described in connection with the accompanying drawings, and specifically pointed out in the claims.

Figures 1 and 2 are diagrams illustrating the forces upon which my method of balancing is based. Fig. 3 illustrates the manner of placing the vessel approximately in standing or neutral equilibrium. Figs. 4, 5, 6, 7, and 8 illustrate different steps in my method of balancing a vessel mounted on a vertical spindle.

In Fig. 1, A is a cylindrical body mounted upon a vertical spindle B, the lower end of which is supported in a step-bearing 2, while the upper portion is steadied by a bearing 1.

The perpendicular line $d\ d$ represents the fixed axis of rotation maintained by the bearings 1 and 2 and which passes through the center of gravity of the body A. Though the weight of this body is equally distributed around the axis $d\ d$, it is not symmetrically distributed above or below the horizontal plane $c\ c$, which passes through the center of gravity at right angles to the axis $d\ d$. If the body be rotated, it will be found that at ordinary speeds the pressure and consequent wear upon the spindle in the bearings 1 2 will be practically uniform all around. If the speed of rotation be greatly increased, however, this uniformity will disappear. It will be found that the main pressure and wear in the bearings 1 and 2 will be on the same side of the spindle as at $b$ and $b'$. The uneven pressure will, however, be most evident at the lower end of the spindle, which is farthest from the center of gravity of the body. This effect is produced by the tendency of the weight in the body A to arrange itself symmetrically above and below the horizontal plane $c\ c$, the resultant tendency of the parts being to readjust themselves in the directions indicated by the arrows, the mass swinging on the center of gravity *a*. It is evident that if a weight *f* be added on the same side as *b* and on the lighter side of the horizontal plane *c c* it would tend to reduce the effort for readjustment in the directions indicated and therefore to reduce the undue pressure and wear at *b*. The addition of this weight *f*, however, would evidently have the effect of destroying the former equal distribution of weight about the axis of rotation *d d*, and the proper way to correct the difficulty would be to place equal weight at *e* and *f*, which will thus cooperate in counteracting the tendency described without changing the balance around the axis *d d*, the neutral equilibrium hereinafter referred to.

In Fig. 2 the conditions are somewhat different from those described in Fig. 1. The weight in body A is symmetrically distributed above and below the horizontal plane *c c*. It is not equally distributed, however, about the fixed axis *d d*, the center of gravity being at *a* and the normal axis of rotation being through *d′ d′* instead of *d d*. If the body be rotated at a slow or moderately slow speed, the effect of the unequal distribution of weight around the axis of rotation *d d* will be what would naturally be expected, undue pressure and wear upon the spindle in the bearing 1 on the same side as the excess of weight, this effect being due simply to the tendency to fall in the direction of the excessive weight. As the speed is increased, however, instead of this undue pressure increasing it will decrease and after passing an apparently neutral point the increased pressure and wear will be found transferred to *b* and *b′* on the opposite and lighter side of the spindle and will be substantially equal at both points. This result is due to the well-known law which causes a body to rotate upon an axis passing through its center of gravity. The tendency of a rapidly-rotating mass is to find this normal axis of rotation. Therefore, if when rotating at high speed undue pressure and wear are found on one side and about equal at *b* and *b′*, it can be remedied, not by adding weight to the opposite side, but by adding to the same side, as at *h*, thereby shifting the normal axis of rotation from *d′ d′* toward *d d* the center line of the spindle and the fixed axis, and when the two correspond the undue pressure will entirely disappear.

I will now describe the method of balancing a well-known type of vertical centrifugal vessels such as are used in separating cream from milk, the corresponding parts being lettered similarly to Figs. 1 and 2, except that the vessel used instead of the cylindrical body A is lettered C and the neck formed thereon *c′*. After the bowl has been secured to the spindle, centered thereon as closely as possible, and any permanent attachments to it have been made, the first step I take is to put it in approximately "standing balance" or neutral equilibrium by rolling it on the spindle upon a level surface K, as represented in Fig. 3, using a perfectly symmetrical counterbalance L on the other end of the spindle and adding a weight or weights *h* to the inner periphery of the vessel opposite any part which tends to find the lowest position until the vessel remains in any position it may be placed. The vessel is then set in a frame having suitable bearings 1 and 2 and rotated at considerable speed. To determine where it is running out of true, a lead-pencil may be firmly held so as to touch only the portion of the rotating surface coming nearest it, as is commonly done for this purpose. The part marked by the pencil is therefore the part thrown farthest from the fixed center of rotation and therefore the part of the spindle subjected to greatest pressure and wear in the adjoining bearing. In the elevations these markings are illustrated by a series of dots and on the plan view forming part of Fig. 4 by a line *g*. In Fig. 4 the marks are shown on the neck *c′* and on the spindle adjacent to the lower bearing 2, these places being practically preferable for marking at this stage. Being respectively above and below the center of gravity, the marks are on opposite sides; but if the spindle were marked adjacent to the upper bearing 1 the markings would be on the same side as those at the lower end of the spindle. To correct this in accordance with the principle described in Fig. 1 equal weights *e* and *f* may be placed, as shown in Fig. 5, which figure represents their effect to be the transfer of markings on both neck and lower end of spindle to the same side, the directions in which the weights act being indicated again by arrows. The radial forces exerted by the weights balance each other, so that the joint effect of the weights is merely to swing the mass about the center *a*. It will be understood, of course, that the addition of the weights, as described, may not transfer the marks to the side mentioned. If they should happen to be just the proper size and location the spindle would run true, and if the weights should be too heavy it would transfer both marks to the opposite sides. The presumed effect for this description is to bring both to one side, as shown. After thus attaining an approximate balance the vessel is filled with water to secure the same conditions as in actual service, run up to full speed, and marked again near each bearing. If the marks be on the same side as in Fig. 5, a weight *h* may be applied on the same side as the marks and on the center line *c c*, as shown in Fig. 6. The effect of this will be to shift the normal axis of rotation toward the weight, thus relieving the undue pressure in the bearings. The next markings may be nearly uniform all around adjacent to the upper bearing, but still upon one side at the lower end, as shown in Fig. 6. The most effective way of remedying this is as indicated in Fig. 7, in which a light weight *m* is placed in the neck on the same side as the lower marks, Fig. 6. Being very near the center of rotation, but far away from the plane c c, its effect is almost exclusively upon the lower bearing, the marking upon which will be made uniform all around if the weight be sufficient and properly placed. If the weight shifts the marking to the opposite side, it is too heavy. If it keeps on the same side, it is too light. If it shifts partway around, as indicated in Fig. 8, the weight should be moved toward the marking, as indicated by dotted lines. This principle of shifting the weight around the center applies also in truing the upper bearing to the weight h on the periphery of the vessel.

I have thus clearly described the principles involved in my method of balancing and the the practical application of those principles. I do not attempt, however, to indicate such variations in the location of the balancing-weights as will readily suggest themselves in practice. The definite directions given to effect the changes described will enable any one skilled in the art to so shift a single weight as to secure the best possible effect from both the forces described, thus rendering it easy to attain a practically perfect balance at the working speed with highly advantageous results.

What I claim is—

1. The method of balancing a centrifugal vessel rigidly mounted upon a vertical spindle rotating in bearings, which consists in adding weights to opposite sides of the vessel respectively above and below the plane passing through the center of gravity at right angles to the fixed axis of rotation for the purpose of making the normal axis of rotation substantially parallel with the fixed axis, substantially as set forth.

2. The method of balancing a centrifugal vessel rigidly mounted upon a vertical spindle rotating in bearings, which consists, first, in adding weights to opposite sides of the vessel respectively above and below the plane passing through the center of gravity at right angles to the fixed axis of rotation for the purpose of making the normal axis of rotation substantially parallel with the fixed axis, and, second, in adding a weight to one side of the vessel substantially on the plane passing through the center of gravity at right angles to the fixed axis of rotation for the purpose of shifting the normal axis of rotation horizontally toward said weight, substantially as set forth.

3. The method of balancing a centrifugal vessel rigidly mounted upon a vertical spindle rotating in bearings, which consists, first, in placing the vessel in neutral equilibrium by rolling it on its spindle upon a horizontal surface and adding weight to the light side; second, in adding weights to opposite sides of the vessel respectively above and below the plane passing through the center of gravity at right angles to the fixed axis of rotation for the purpose of making the normal axis of rotation substantially parallel with the fixed axis, and, third, in adding a weight to one side of the vessel substantially on the plane passing through the center of gravity at right angles to the fixed axis of rotation for the purpose of shifting the normal axis of rotation horizontally toward said weight, substantially as set forth.

In testimony whereof I affix my signature in presence of two witnesses.

PHILIP M. SHARPLES.

Witnesses:
E. B. MANCILL,
M. L. WALSH.